United States Patent
Ströbel et al.

(10) Patent No.: US 7,718,293 B2
(45) Date of Patent: May 18, 2010

(54) ELECTROCHEMICAL SYSTEM WITH FLUID PASSAGE INTEGRATED WITHIN A SEALING BEAD

(75) Inventors: Raimund Ströbel, Ulm (DE); Bernd Gaugler, Ulm (DE); Albrecht Sailer, Neu-Ulm (DE); Claudia Kunz, Ulm (DE); Joachim Scherer, Ulm (DE); Christian Schleier, Günzburg (DE); Johann Waldvogel, Krumbach (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 1118 days.

(21) Appl. No.: 10/531,201

(22) PCT Filed: Oct. 14, 2003

(86) PCT No.: PCT/EP03/11347
§ 371 (c)(1),
(2), (4) Date: Feb. 8, 2006

(87) PCT Pub. No.: WO2004/036677
PCT Pub. Date: Apr. 29, 2004

(65) Prior Publication Data
US 2007/0231619 A1    Oct. 4, 2007

(30) Foreign Application Priority Data
Oct. 14, 2002    (DE) ............... 102 48 531
May 22, 2003    (DE) ............... 203 08 332

(51) Int. Cl.
*H01M 2/00* (2006.01)

(52) U.S. Cl. ............... 429/34; 429/35; 429/38; 429/30

(58) Field of Classification Search ............... 429/34, 429/35, 36, 38, 30, 12; 204/242, 245, 253, 204/263
See application file for complete search history.

(56) References Cited

U.S. PATENT DOCUMENTS 3,012,086 A    12/1961    Vahldieck (Continued)

FOREIGN PATENT DOCUMENTS

DE    4309976 A1    9/1994

(Continued)

OTHER PUBLICATIONS

International Search Report (3 pages).

(Continued)

*Primary Examiner*—Raymond Alejandro
(74) *Attorney, Agent, or Firm*—Marshall & Melhorn, LLC

(57) ABSTRACT

The invention deals with an electrochemical system for compressing gases and/or for producing gases by electrolysis, consisting of an electrochemical compressor stack (1) having layering of several electrochemical cells, which are separated from one another in each case by bipolar plates (3; 3'), wherein the bipolar plates have openings for media supply and media discharge (5a, 5b) for the electrochemical cells and the electrochemical cell stack can be placed under mechanical compressive strain in direction (6) of the layering. The bead arrangements (7; 7') are resilient and are provided at least in some regions to seal the openings (4, 5a, 5b) and/or an electrochemically active region (10) of the electrochemical cells.

8 Claims, 13 Drawing Sheets

U.S. PATENT DOCUMENTS

| | | | |
|---|---|---|---|
| 3,320,092 A | 5/1967 | Uline | |
| 4,514,475 A | 4/1985 | Mientek | |
| 4,604,331 A | 8/1986 | Louis | |
| 5,362,578 A | 11/1994 | Petri et al. | |
| 5,928,807 A | 7/1999 | Elias | |
| 7,189,468 B2 | 3/2007 | Izenson et al. | |
| 2004/0053104 A1 | 3/2004 | Novkov et al. | |
| 2004/0137306 A1* | 7/2004 | Turpin et al. | 429/37 |
| 2005/0064267 A1* | 3/2005 | Guttermann et al. | 429/37 |

FOREIGN PATENT DOCUMENTS

| | | |
|---|---|---|
| DE | 19829142 A1 | 1/2000 |
| DE | 10028395 A1 | 12/2000 |
| DE | 200 21017 U1 | 3/2001 |
| DE | 19947858 A1 | 4/2001 |
| DE | 10158772 C1 | 6/2003 |
| EP | 0 408 104 | 1/1991 |
| JP | 2000-48835 | 2/2000 |
| JP | 2000048835 | 2/2000 |
| WO | WO-01/48845 | 7/2001 |
| WO | WO-02/069416 | 9/2002 |

OTHER PUBLICATIONS

Patent Abstracts of Japan for JP 2000-48835 (1 page).

* cited by examiner

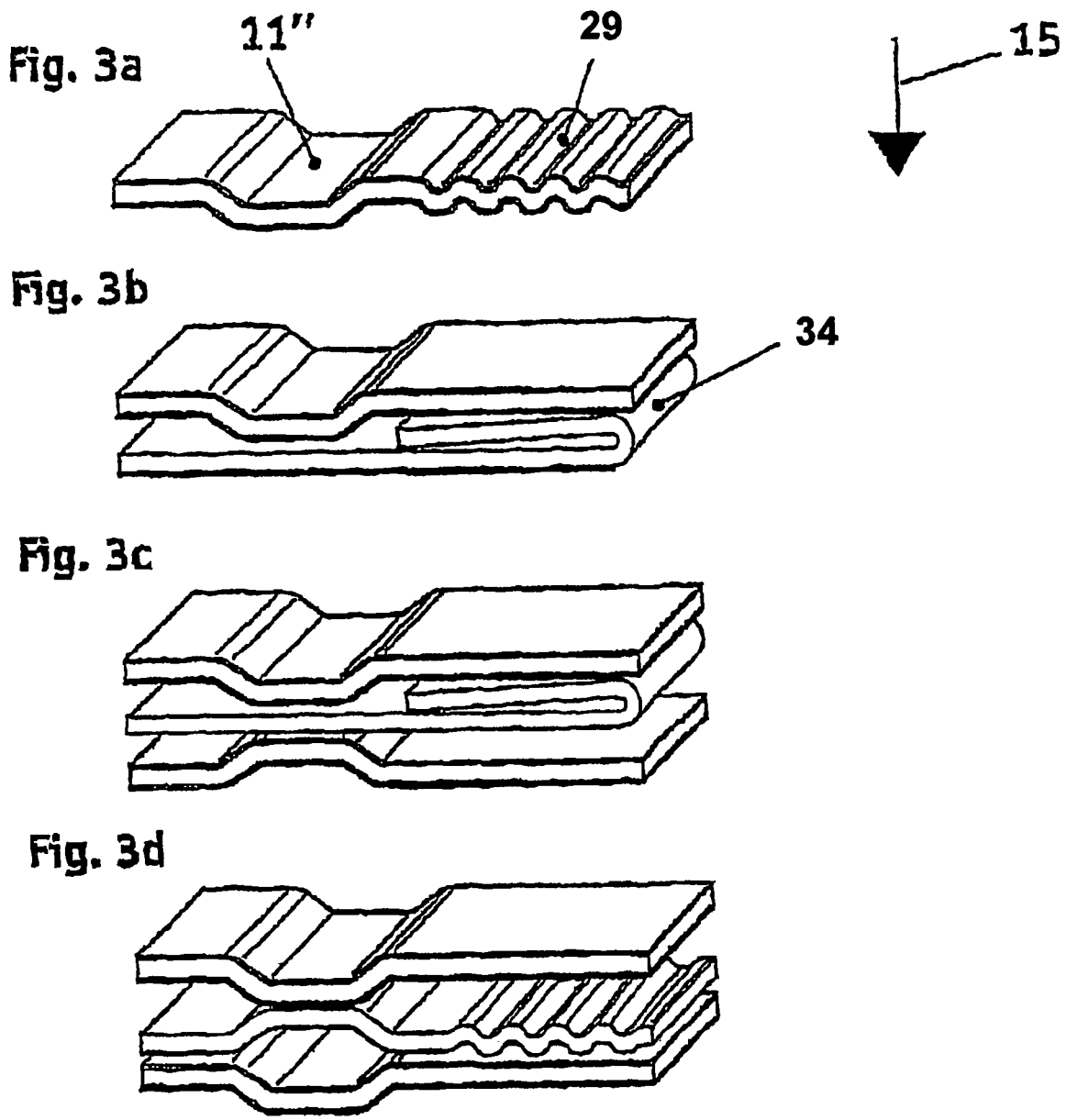

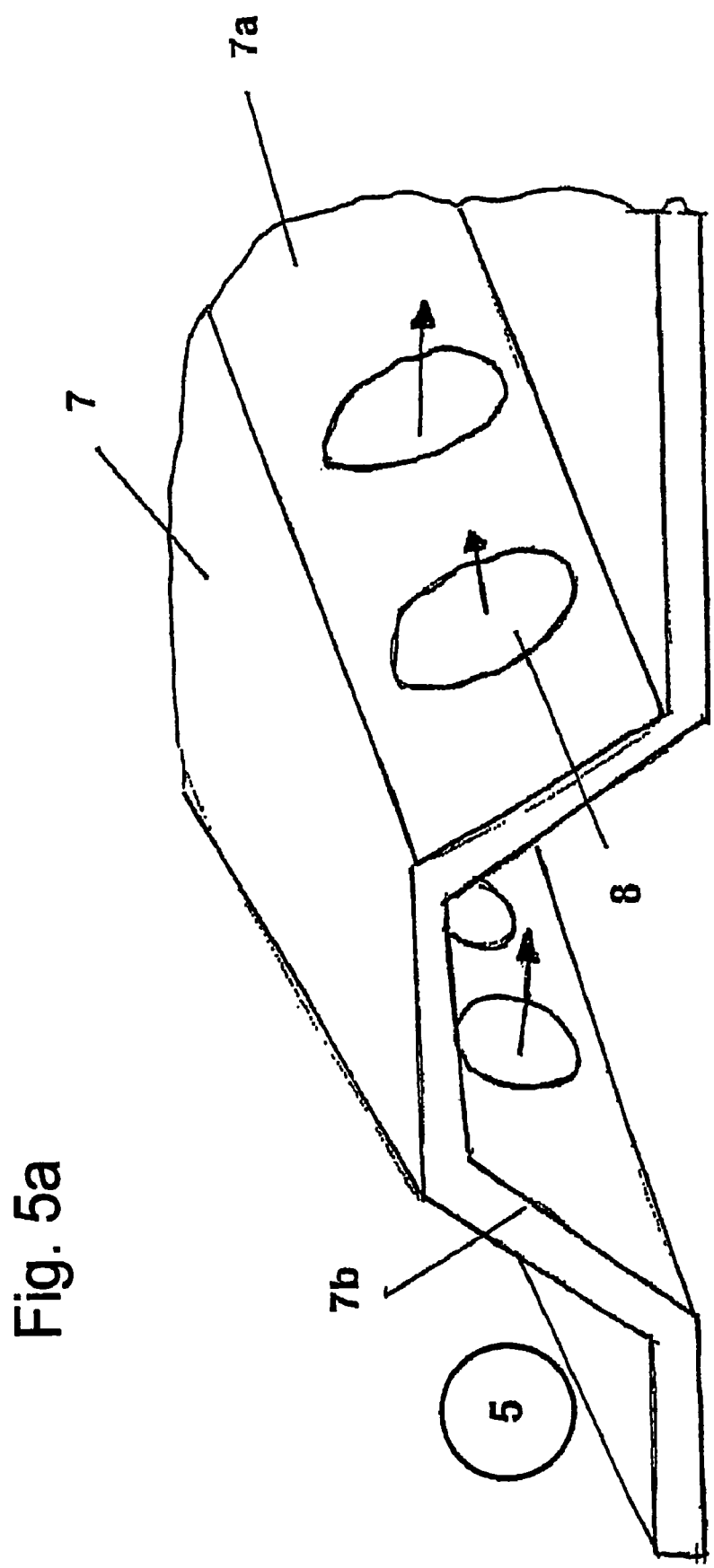

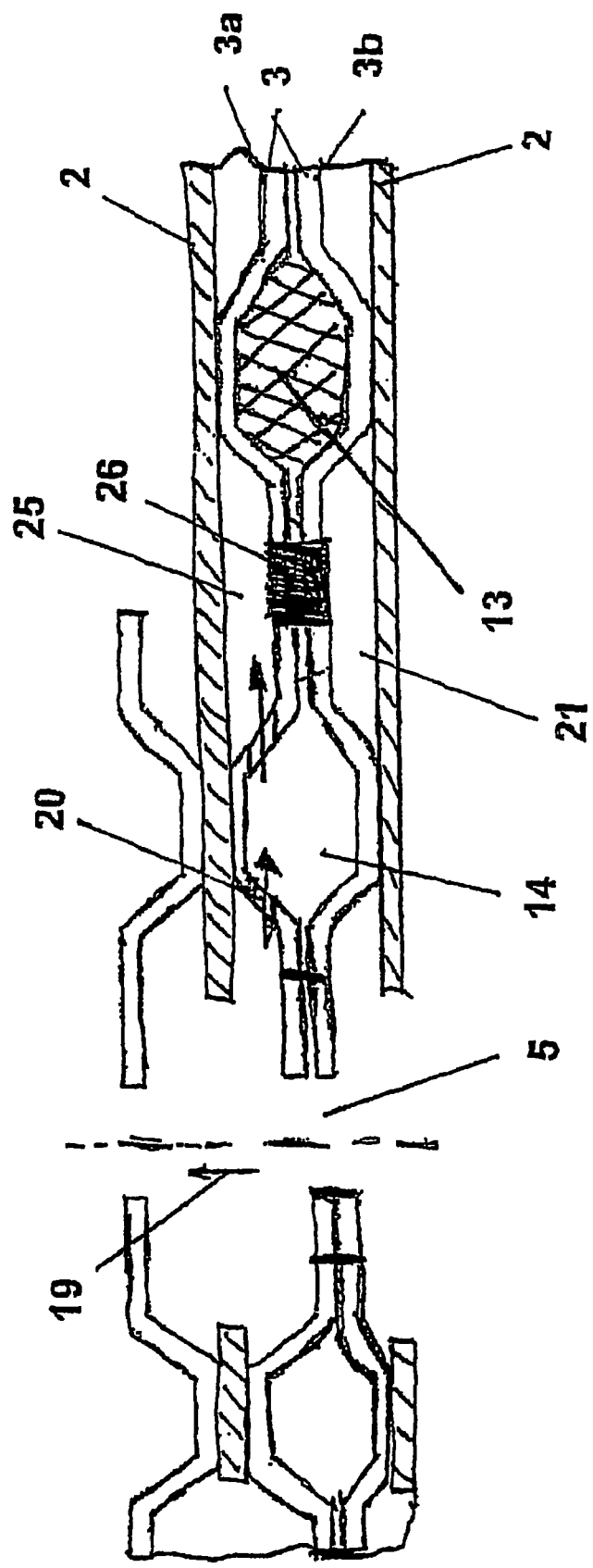
Fig. 5b (Schnitt A-A)

30   31   32   33

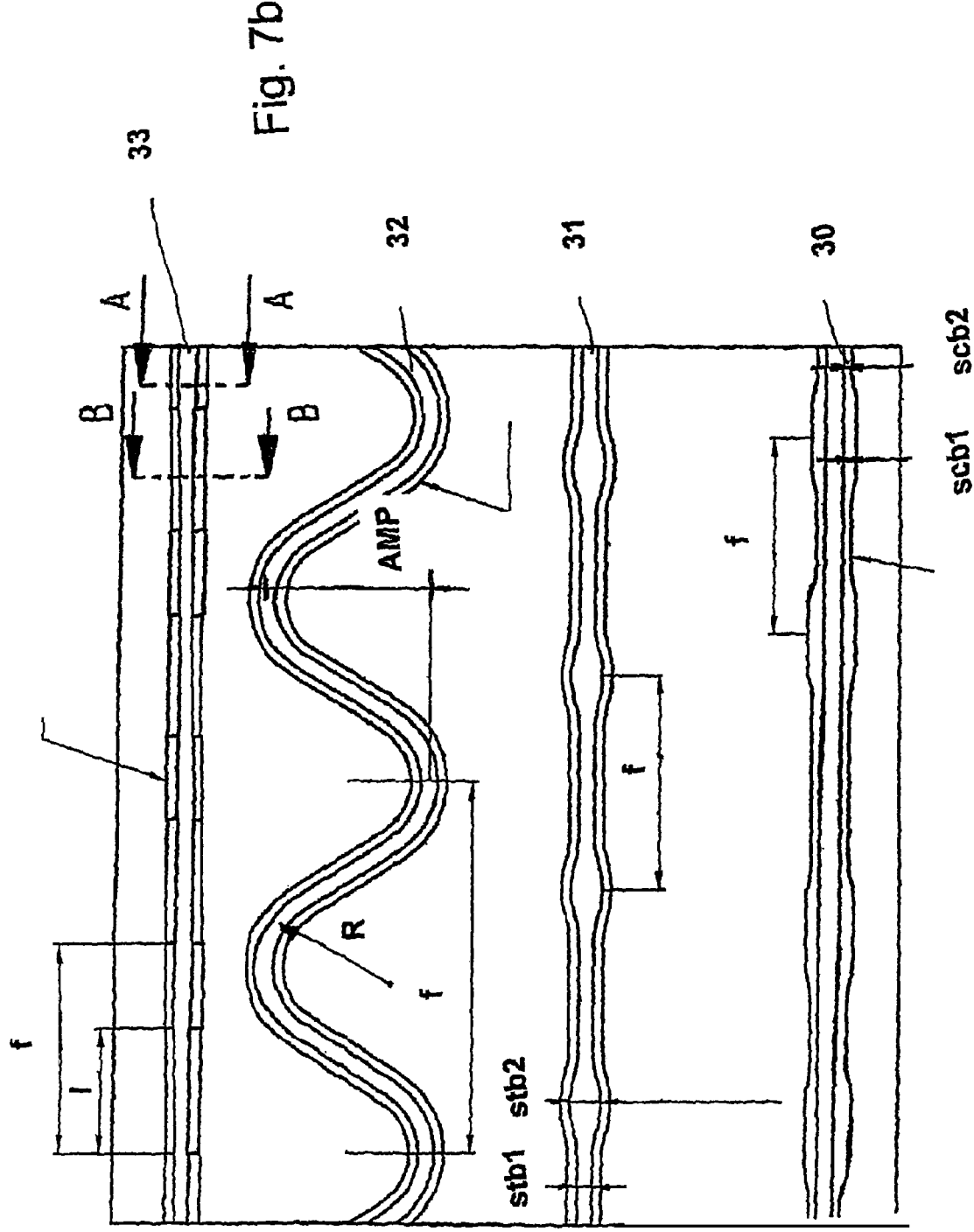

ELECTROCHEMICAL SYSTEM WITH FLUID PASSAGE INTEGRATED WITHIN A SEALING BEAD

FIELD OF THE INVENTION

The present invention relates to an electrochemical system, such as for example a fuel cell system or an electrochemical compressor system.

BACKGROUND OF THE INVENTION

Electrochemical compressor systems may be, for example electrolysers, which by applying a potential, in addition to producing, for example water and oxygen from water, compress these gases at the same time under high pressure.

In addition, electrochemical compressor systems, such as for example electrochemical hydrogen compressors, are also known, to which gaseous molecular hydrogen is supplied and the latter is compressed electrochemically by applying a potential. This electrochemical compression is available particularly for small quantities of hydrogen to be compressed, since mechanical compression of hydrogen would be considerably more expensive here.

Electrochemical systems are known, in which an electrochemical cell stack is constructed with layering of several electrochemical cells, which are separated from one another in each case by bipolar plates. The bipolar plates thus have several tasks:

- electrical contacting of the electrodes of the individual electrochemical cells and conveying the current to the adjacent cell (series connection of the cells),
- supplying the cells with reactants, such as for example water or gases and, for example removal of the reaction gas produced via an appropriate distributor structure,
- conveying the heat being produced during generation in the electrochemical cell, and
- sealing off of the various media ducts or cooling ducts with respect to one another and externally.

The bipolar plates have openings for cooling or media supply and media discharge for media supply and media discharge from the bipolar plates to the actual electrochemical cells (these are for example MEA (Membrane Electron Assembly) having a gas diffusion layer, for example made from a metal mat, orientated in each case towards the bipolar plates).

Difficulties regularly result here particularly with regard to the gas diffusion layer. It has been conventional hitherto to design the seal between the bipolar plates or between bipolar plates and the electrochemical cell in that an elastomer seal is placed, for example in a groove of the bipolar plate. By exerting compressive strain (for example by means of tension bands) on the electrochemical cell stack, pressing of the seal then takes place, as a result of which a sealing effect should be achieved for the openings.

It is now a problem for the inserted gas diffusion layer that it may be designed as a fibre mat (with metal fibres) or metal mesh. Fibre mats which are conventional in industry have a theoretical thickness of, for example 1 mm, but the manufacturing tolerance is ±100 μm. The metal fibres which construct the mat are themselves only slightly resilient. In addition, it is also not recommended to compensate production tolerances of the fibre mat by compressing the mat, since the gas permeability of the mat layer is thus severely diminished and hence operation of the electrochemical cell is restricted. On the other hand however, it is necessary to exert a minimum pressure on the entire gas diffusion layer by the bipolar plate, so that there is an adequate passage of current through the gas diffusion layer. It can thus be summarised that for the current elastomer seals, either a non-perfect seal or non-optimum operation of the electrochemical cell was thus to be accepted. In addition, particularly for electrochemical cells operated using molecular hydrogen, permeation losses of $H_2$ occur which diffuse through the elastomer seal.

As a first aspect, the object of the present invention is therefore to achieve a secure seal of the openings in an electrochemical cell stack with as low costs as possible.

This is achieved by an electrochemical compressor system according to the invention.

By providing bead arrangements, which are resilient at least in some regions, for sealing the openings, a secure seal is achieved over a long resilient path of the bead arrangement. Openings are thus understood to mean virtually any region to be sealed in the present application. This may be, for example a passage opening for a reaction fluid (for example $H_2$ or water) or a cooling agent. However, it may also be, for example the electrochemically active region, in which for example the gas diffusion layer is arranged or screw holes are provided. The resilient bead arrangement always permits compensation of production tolerances of, for example gas diffusion layers, in a wide tolerance range and nevertheless provision of an optimum sealing effect.

A very advantageous embodiment of the invention envisages that the bead arrangement is designed for microsealing with a thin coating having a thickness between 1 μm to 400 μm. The coating is advantageously made from an elastomer, such as silicone, viton or EPDM (ethylene/propylene-diene terpolymer), application is preferably effected by a screen-printing process, tampon-printing process, spraying or by CIPG (cured in place gasket; that is elastomer introduced at the site of the seal as liquid which is cured there.). These measures ensure that, for example hydrogen diffusion is reduced to an extremely low degree by the seal, since the height of the permeable material is adapted to a minimum. Attempts are thus made not to recover additional geometric height, but only to provide roughness compensation for microsealing.

A further advantageous embodiment of the invention envisages that the bead arrangement contains a full bead or a half bead. It is thus also possible within a bead arrangement to provide both forms, since depending on the course of the bead arrangement in the plane, other elasticities may prove useful, for example that in narrow radii a different beading geometry is useful than for straight courses of the bead arrangement.

An advantageous development of the bead arrangement envisages that the bead arrangement is designed at least in some regions as a half bead constructed around the electrochemically active region and open is around the latter in some regions. It is thus attached so that it is open towards the high-pressure side, thus ensuring that by increasing the internal pressure, the increase in contact pressure of the bead against the sealing surface of the next bipolar plate (or the membrane lying therebetween) is achieved. Since the electrochemical compressor stack is stabilised externally by end plates which are held together using tension bands or the like, yielding of the stacked individual plates is only possible to a limited extent. There is no "elastic expansion" of the entire arrangement but only a rise in contact force in regions of the seal so that there is even self-stabilisation of the seals or of the entire arrangement. The half bead is thus designed so that by increasing pressure in the system (this internal pressure may be over 200 bar, preferably over 700 bar, particularly preferably over 1,000 bar up to 5,000 bar) in the electrochemically active region, surface pressure directed in the direction of the electrochemical compressor stack is increased so that tightness problems are excluded and thus a quasi "self-stabilising" system is provided with regard to the seal.

A further advantageous embodiment envisages that the bead arrangement is made from steel. Steel has the advantage that it can be processed very cost-effectively using conventional tools, in addition, for example methods for coating steel with thin elastomer layers are well tested. The good elasticity properties of steel facilitate the good design of the long resilient sealing region of the invention according to the invention. There is thus the particular possibility that the bead arrangement is attached to the bipolar plate. There is thus firstly the possibility that the bipolar plate is designed as a whole as a steel moulding (which is possibly provided with a coating for corrosion resistance or conductivity in some regions). However, it is also possible that the bipolar plate is designed as a composite element of two steel plates with a plastic plate lying therebetween. However, in each case the good manufacturing possibilities of steel may be utilised, it is possible to make the bead arrangement within a manufacturing step which is taking place in any case (for example embossing of a flow field, that is a "stream field"). Very low costs are thus produced, also no additional sources of error are provided by extra components, such as for example additionally inserted elastomer seals.

Nevertheless, it is also possible according to the invention to provide the bead arrangement made from other metals, such as for example steel, nickel, titanium or aluminium and alloys thereof. The choice, which metal is to be preferred, thus depends, for example also on the required electrical properties or the required degree of corrosion resistance.

It thus becomes possible to adapt the compression characteristic of the bead, for example to a gas diffusion layer. However, this does not have to apply only to gas diffusion layers, the bead line may generally be well adapted to components having low elasticity. The beaded seal can be designed flexibly and hence in addition can be applied well and without high retrofitting costs for all producers of electrochemical compressor systems.

A further advantageous embodiment envisages that the bead arrangement has a stopper, which limits compression of the gas diffusion layer to a minimum thickness. It is thus an incompressible part of the bead arrangement or a part, the elasticity of which is very much lower than that of the actual bead. This ensures that the degree of deformation is limited in the bead region, so that there cannot be complete flat pressing of the bead.

A further advantageous embodiment envisages that the bead arrangement is arranged on a component which is separate from the bipolar plate. This is particularly favourable when the bipolar plates consist of material which is unsuitable for bead arrangements. The separate component is then placed on the bipolar plate or integrated by adhesion, clicking-in, welding-in, soldering-in or moulding-in, so that overall a sealing connection is produced between the separate component and the bipolar plate.

Finally, a further advantageous embodiment envisages that the bead arrangement is designed from an elastomer roll. Such a bead can be applied by a screen-printing process or tampon printing. It serves both for microsealing and for macrosealing. The roll also assumes the function of path adaptation on a gas diffusion layer.

A further advantageous development envisages that the electrochemical compressor system is designed as an electrolyser. Here, water introduced on one side of the electrochemical cell is cleaved electrochemically into molecular hydrogen and oxygen. Membranes made from Nafion or similar proton-conducting systems are used for this, but separators may also be used, which contain, for example PTFE foams soaked with potassium hydroxide. Also porous ceramic structures, soaked with potassium hydroxide, are possible separators, for example structures based on Nextel or also hydroxide-conducting structures. The contact forces (surface pressures of the seal in the main direction of the electrochemical cell stack) may lie between 0.1 and 200 N/mm$^2$, preferably over 10 N/mm$^2$, particularly preferably over 50 N/mm$^2$.

A further advantageous development envisages that the electrochemical compressor system is a hydrogen compressor, which oxidises molecular hydrogen introduced on the first side of a proton-conducting electrochemical membrane to H$^+$ and reduces it again on the second side back to molecular hydrogen, wherein the molecular hydrogen there is subjected to a higher pressure on the second side than on the first side due to the sealing and spatial arrangement. The operating temperature should lie here between 0 and 100° C., conceivably also 0-200° C. or 0-550° C. Hydroxide-conducting structures or even known proton-conducting polymer membranes (for example made from Nafion) may be used here as membranes.

Of course other gases may also be compressed correspondingly for a suitable choice of ion conductor, for example oxygen with hydroxide-conducting structures.

Overall it should be remembered that the present electrochemical compressor system should at the very best tolerate very high pressures which are significantly higher than for other electrochemical mechanisms. The prevailing gas pressure in the electrochemically active region should be able to be without leakage losses at least 100 bar, preferably over 200 bar, particularly preferably over 500 bar.

A second aspect of the present invention is concerned with the object of achieving secure sealing of the openings in an electrochemical cell stack with as low as possible costs, wherein also safe supply of media for cooling and for operation of the electrochemical cell (in particular O$_2$ or air or H$_2$) from the openings to cooling cavities or towards the electrochemically active regions of the electrochemical cell should be guaranteed safely. This aspect can be applied to any electrochemical systems, such as for example fuel cells or the above-mentioned electrochemical compressor systems.

This object is achieved in that resilient bead arrangements are provided around the openings of at least one bipolar plate, wherein perforations for conducting liquid or gaseous media are arranged on at least one flank of the bead arrangements. An electrochemical compressor system (or for a fuel cell system) consisting of an electrochemical cell stack (or a fuel cell stack) having layering of several electrochemical cells (or fuel cells), which are separated from one another in each case by bipolar plates, wherein the bipolar plates have openings for cooling or media supply and media discharge for the electrochemical cells (fuel cells) and the electrochemical cell stack (or fuel cell stack) can be placed under mechanical compression strain in the direction of the layering, wherein resilient bead arrangements are provided around the opening of the bipolar plate, wherein perforations for conducting liquid or gaseous media are arranged on at least one flank of the bead arrangements, is thus shown here.

It is thus particularly advantageous that first of all sealing of the openings is generally achieved by the bead arrangement when applying a mechanical pressure in the direction of layering of the electrochemical cell stack, which sealing is cost-effective and provides good tolerance compensation. Specific supply or discharge of cooling agents into corresponding cooling agent cavities and also secured media supply and media discharge is also additionally facilitated by the perforations in the flanks of the bead arrangements. It is no longer necessary that the bead has to be completely interrupted in order to supply or discharge cooling agents or operating media quasi orthogonally to the direction of layering of the electrochemical cell stack (which coincides here with the direction of an interface duct). Hence it is already possible in the production of these bipolar plates to provide the corresponding perforations which lead later to media supply in the finished electrochemical compressor system. It is thus advantageous that such perforations can be easily produced on a large scale, flow resistances and the stiffness of the bead arrangement etc. may be preset precisely by varying the perforations.

In particular cost-effective production of a bipolar plate or of parts of the bipolar plate is possible in that a metal plate is provided with holes first of all and then mechanical shaping of the perforated plate takes place to produce the bead arrangement so that the previously introduced holes are perforations in at least one flank of the bead arrangement. Of course it is however also possible to first emboss the profile of the bipolar plate and then to introduce the perforations, for example using laser processing, punch supply etc.

Hence, it may be said by way of summary that the value of the invention lies in that simplified media supply to the active region of the bipolar plate is possible. "Tunnelling" of a seal is not necessary, since the media supply in this case takes place through the sealing system itself. This is firstly space-saving and secondly facilitates higher volume and weight capacities of the electrochemical cell. The invention is available particularly for metallic bipolar plates for PEM electrochemical cells, which are constructed in most cases from two embossed metal sheets which are flatly connected to one another. The media water, in some cases cooling water, and the gases thus have to be effectively sealed with respect to one another. If the seal of a metallic bipolar plate is designed as a bead construction, the bead is in most cases severely flattened at the points through which media should flow into the active region. Support for the membrane is not present at these points, which may lead to gas leakages ("cross-over") or to the collapse of the membrane into the supply channel. However, if perforations are introduced into the flanks of the bead, and permit the media, for example hydrogen, air, distilled water, to flow transversely through the bead into the flow field region of the bipolar plate, the bead is able to rest against the membrane uninterrupted. Clean sealing of the media flows is thus achieved. The perforations may thus be designed more advantageously as circles or also as ovals in order not to noticeably change the spring characteristic of the bead. Sealing between the fluid flows occurring in the electrochemical cell is guaranteed by a design of the second metallic plate adapted to the bead construction in the region of media passage. The beads may thus be designed as full beads or half beads. Furthermore, media passage may take place through the bead with connected ducts. This is advantageous especially for guiding the cooling medium. It may thus be guided more easily between the anode and the cathode plates.

A further advantageous development envisages that the perforations in the flank plane may have a circular, oval or angular cross-section. The flow properties of fluids guided through these perforations may be influenced first of all by this shaping and the appropriate number of perforations per flank plane. In addition, the stiffness of the bead arrangement can also thus be controlled for stress in the direction of layering of the electrochemical cell stack, since the corresponding geometrical moments of inertia are also co-influenced by shaping of the perforations.

A particularly advantageous development envisages that a duct is connected to a perforation, wherein the duct is connected to the bead interior and is closed at least towards the bead outer surface. This ensures that the perforations are not guided directly from the bead interior to the outside, but that specific delivery through a duct, for example in the hydrogen gap of the bipolar plate, is possible; the introduction of oxygen into the cathode of the electrochemical cell is thus prevented. It is particularly advantageous in terms of production technology that these ducts may also be co-embossed at the same time as embossing of the bipolar plate (when it consists, for example of metal), alternatively, of course the later or earlier attachment of individual ducts is possible.

A further development envisages that the perforations are open towards the electrochemically active region of the electrochemical cell. This is applied in particular to introduce media, such as hydrogen. Of course different variants next to one another at the same time are also possible in a single bipolar plate, that is those perforations which are connected to ducts and those perforations which have no ducts.

An industrially particularly promising embodiment envisages that the bipolar plate is constructed from two (metal) plates, which has a cavity lying therebetween for cooling agent and/or passing of media gases, such as $H_2$. The interior of this bipolar plate may thus also be divided into segments, for example into those which serve on the one hand for guiding cooling agent and on the other hand for distributing media gases. This segmenting may thus be provided by connecting regions of the two plates, which are designed for example as a welding or soldering.

A further advantageous development envisages that the bead arrangement contains a "full bead" or a "half bead". For the full bead there is thus the option of providing perforations on one or on both flanks. Whether a half bead or a full bead is required, depends, inter alia, on the required stiffness or also on the geometry of the opening.

The bead arrangement is available particularly for bipolar plates which consist of metals, such as steel, nickel, titanium or aluminium and alloys thereof. The bead arrangements may thus be part of a topography embossed in the bipolar plate. However, it is also possible to arrange the bead arrangement on a component which is separated first of all from the bipolar plate, and is then placed later in particular on bipolar plates made from metal, plastic, graphite or the like or connected to the bipolar plate by adhesion, clicking-in, welding-in, soldering-in or moulding-in.

A further advantageous development envisages that the bead arrangement is coated for microsealing. This guarantees, for example with an elastomer layer which is applied for example by a screen-printing process the outer side of the bead arrangement, that microsealing is provided against media passage. This elastomer coating also has the additional effect that in the case of a polymer membrane placed on this coating, a "floating" or "gliding" fixing is provided, which ensures that this membrane of the electrochemical cell remains fixed on the one hand even for size changes in the region of 10% and on the other hand shows no cracks due to too rigid fixing.

A further advantageous development envisages that an electrochemically active region of the electrochemical cell is arranged in an essentially closed chamber, which is limited essentially annularly laterally by a bead arrangement. This means that a bead arrangement is possible not only for sealing openings of the bipolar plate, but that also "total sealing" of the interior of the electrochemical cell stack is possible.

A particularly advantageous development envisages that the bead arrangements have essentially the same stiffness for stresses in the direction of layering of the electrochemical cell stack in the perforated and the non-perforated flank regions. Adjustment of the same stiffness may thus take place in different ways. It may take place, for example by means of a flank angle which varies along the course of the bead arrangement (for example a steeper flank angle in the perforated flank regions) or by a suitable material distribution (that is for example thicker wall thicknesses in the immediate surrounding region of the perforations). For example steels having a maximum tensile strength of $R_m$ of 300 to 1,100 N per mm$^2$, preferably 600 to 900 N per mm$^2$ may be used. These steels have a modulus of elasticity between 150,000 and 210,000 N per mm$^2$.

BRIEF DESCRIPTION OF THE DRAWINGS

The present invention is now illustrated using several figures.

FIGS. 3a to 3d show several bead arrangements with stopper;

FIGS. 5a and 5b show illustration of a bead arrangement with perforations;

FIGS. 7a to 7c show different types of designs of bead arrangements of the invention.

DETAILED DESCRIPTION

Figure 1A:
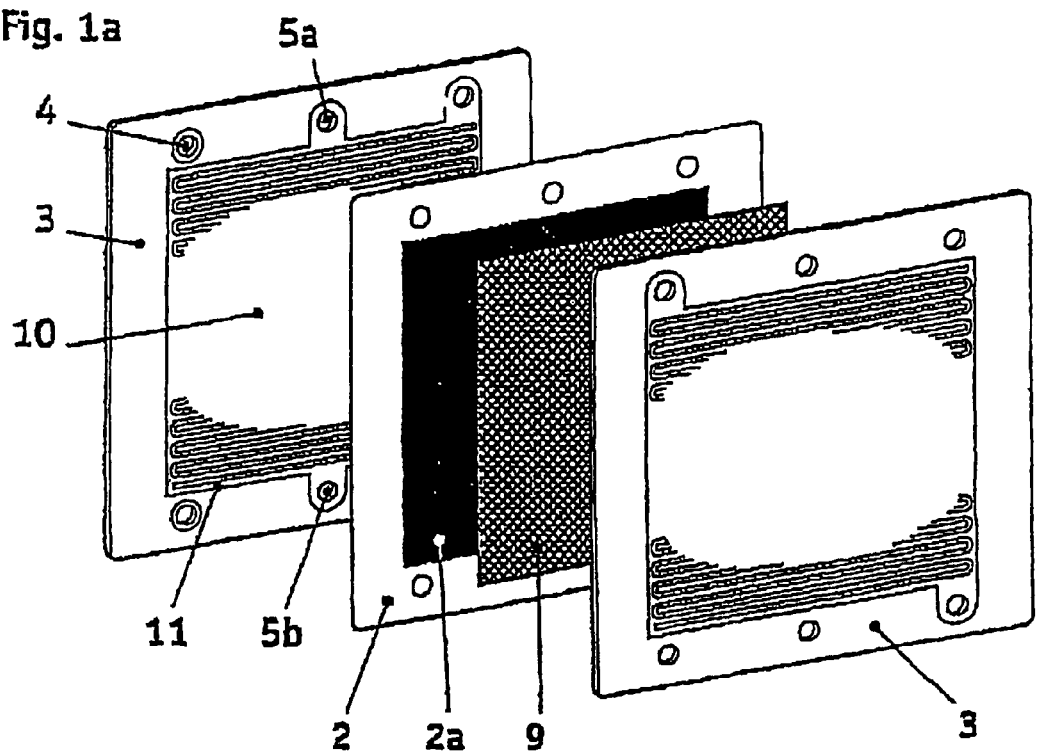
FIGS. 1a to 1c show the type of construction of an electrochemical cell stack.
Figure 1B:
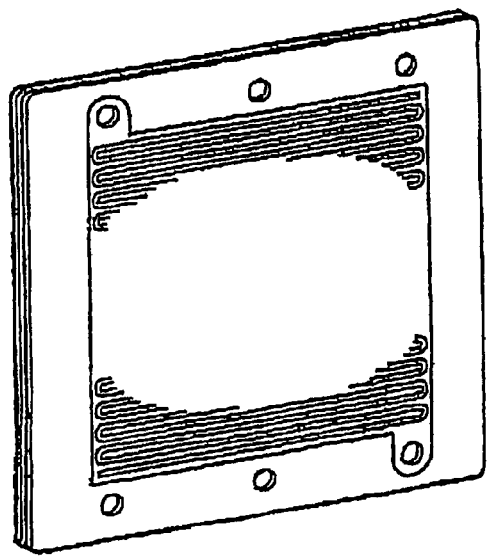
Figure 1C:
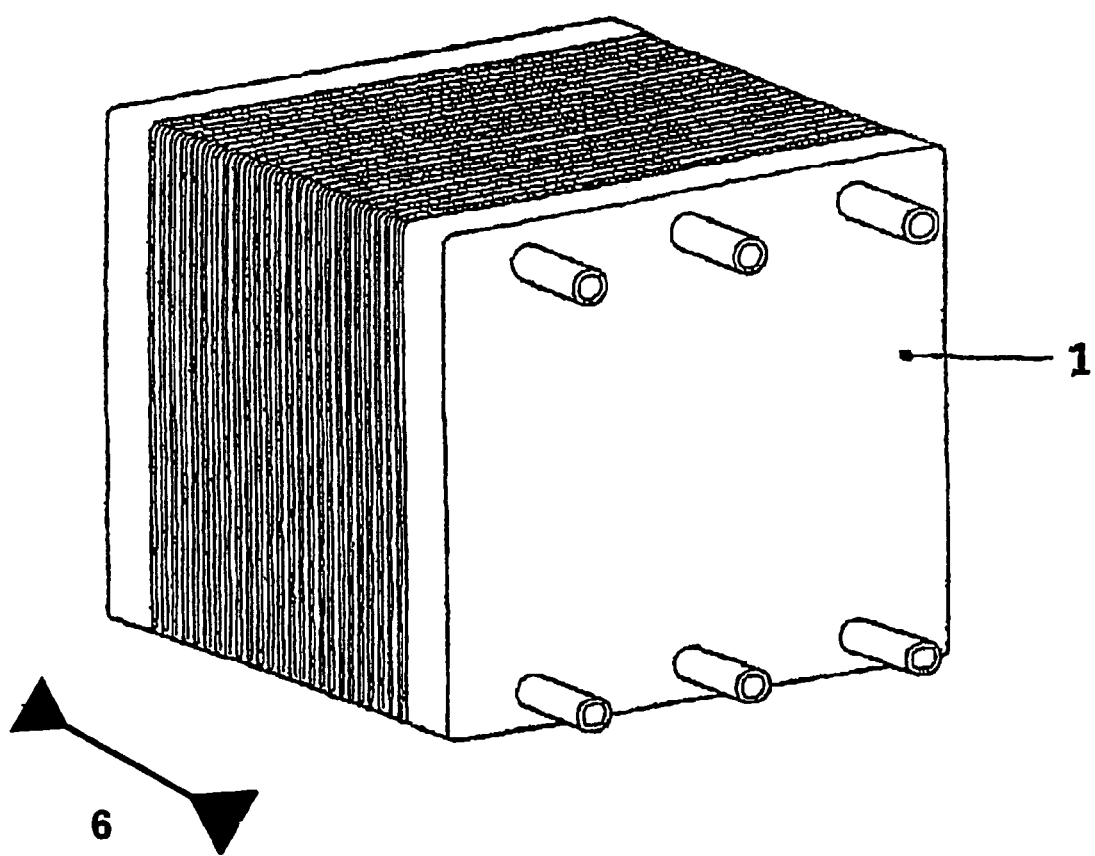

FIG. 1a shows the construction of an electrochemical cell, as shown in FIG. 1b. A plurality of electrochemical cells form in layers the region of an electrochemical cell stack 1 arranged between end plates (see FIG. 1c).

An electrochemical cell 2 with its usual components can be seen in FIG. 1a and has for example an ion-conducting polymer membrane, which is provided in the central region 2a with a catalyst layer on both sides. Two bipolar plates 3, between which the polymer membrane is arranged, are provided in the electrochemical cell. A gas diffusion layer 9, which has dimensions so that it can be accommodated in a recess of the bipolar plate, is also arranged in the region between each bipolar plate and the polymer membrane (optionally, depending on the fine structuring of the bipolar plate). In the assembled state of the electrochemical cell (FIG. 1b), the electrochemically active region of the electrochemical cells, which is covered essentially by the gas diffusion layer, is arranged in an essentially closed chamber 10 (this corresponds essentially to the recess of the bipolar plate mentioned above), which is limited essentially annularly laterally by a bead 11. This closed chamber 10 is gas-tight due to the bead 11, which belongs to a bead arrangement 7 or 7' (see FIGS. 2aa, 2ab, 2b).

Passage openings for media supply 5a and for media discharge 5b lie within the sealing region and are sealed by the bead 11 with respect to further passage openings, for example the passage openings for cooling 4 (which have a separate bead for sealing, which is likewise equipped according to the invention). The sealing effect thus takes place on all beads by exerting pressure on the electrochemical cell stack 1 in direction 6 of the layering (see FIG. 1c). This is effected, for example by means of tension bands not shown here. The bead 11 has the advantage that it has a large resilient compression region, in which it shows an adequate sealing effect. This is particularly advantageous during installation of the gas diffusion layer 9, which is, for example made from graphite or a metal fibre mat (titanium, stainless steel or nickel), which is produced in industry with high production tolerances. Adaptation of the bead to the geometry of the gas diffusion layer is possible due to the wide resilient region of the bead 11. This ensures that on the one hand lateral sealing is provided, and on the other hand, both adequate gas distribution is provided in the gas diffusion layer plane and in addition the contact pressure in layering direction 6 is uniformly and adequately high in order to achieve uniform stream passage through the gas diffusion pipe. To improve microsealing, the bead 11 is provided on its outer side with a coating of an elastomer, which has been applied, for example by a screen-printing process.

In order to limit pressing of the gas diffusion layer, the bead construction is designed with a stopper. This stopper, which may be designed as a fold, as a corrugated stopper or even as a trapezium stopper, is dealt with once again in more detail further below in the description of FIGS. 3a to 3d. All stoppers are dedicated to the function that they are able to limit compression of the bead to a minimum dimension.

The bipolar plate is designed in the present case as a metal moulding. Reference is made to what has already been said with regard to the ease of production and the advantage of steel in connection with bead arrangements.

If the bipolar plate is shaped, for example from a metal which is not suitable for producing suitable bead geometries with the necessary elasticity, the bead region may be designed from a different suitable material (for example steel). Connection of the separate bead component to the bipolar plate then takes place by joining processes, such as welding, soldering, adhesion, riveting, clicking-in. If the bipolar plates are made from a material other than metal, for example from graphite composite, plastic or graphite, the bead region may be designed as a frame from a suitable material. The base material of the bipolar plate, which contains the flow field, is connected to a bead seal frame containing the beads in gas-tight or liquid-tight manner by joining processes, such as fusing, moulding-in, welding, soldering, adhesion, riveting, clicking-in.

Figure 2A:
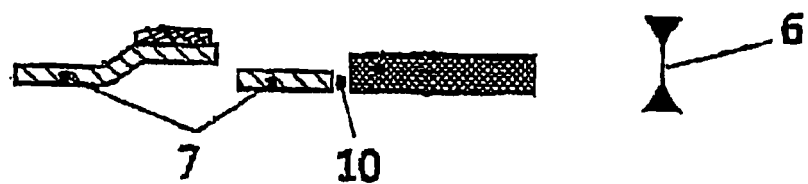
FIGS. 2aa, 2ab and 2b show embodiments of bead arrangements of the invention.
Figure 2A:
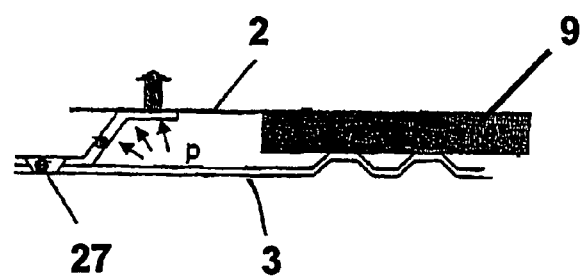

FIGS. 2aa and 2ab show embodiments of a bead arrangement according to the invention. FIG. 2aa shows a cross-section through the bead arrangement 7 which is designed as a half bead. The essentially annular bead 11 encloses the gas diffusion layer 9, as already illustrated in the designs of FIG. 1a. In FIG. 2aa, the bead is designed as a so-called half bead, that is for example like a quadrant. Since the inner region of the electrochemical cell has to be enclosed by a seal, and there are intersections in the region of the media ducts (see FIG. 2c), an alternating design as full bead or half bead is necessary. A full bead may thus transfer into two half beads, which then in each case have in themselves a sealing effect. In addition, the use of a full bead or half bead provides the possibility of adapting the elasticity in a wide framework.

FIG. 2aa shows the bead arrangement 7 in the unpressed state. When exerting mechanical compressive strain on the electrochemical cell stack, pressing takes place in direction 6, so that the bead arrangement 7 or the bead 11 forms a gas-tight lateral seal for the closed chamber 10 with regard to the gas diffusion layer.

FIG. 2ab shows a further cutout of the bead arrangement 11. It is designed as a half bead. This half bead or bead arrangement in the form of a half bead is connected to a bipolar plate 3 via a welded seam 27. The membrane 2 is placed on the upper side of the half bead, which is designed essentially to be "S" shaped. The electrochemically active region is thus enclosed in gas-tight manner by the membrane 2, the half bead 11 and the bipolar plate, so that an internal pressure $p_{internal}$ is provided here. A gas diffusion layer made from metal fibre mat, in this case titanium fibre mat, is placed in the electrochemically active region. The half bead arrangement arranged in this way at least in some regions is designed so that the upper flank of the "S" (see also broad arrow) is pushed upwards due to the increased internal pressure $p_{internal}$ by a pressure increase in the electrochemically active region and thus the surface pressure in this upper flank of the "S" is increased. Since the entire electrochemical cell stack is limited by tension bands to a minimum dimension in the overall extension in the direction of the electrochemical cell stack, there is thus an increase in surface pressure here in the region of this flank and hence an even better seal, it is a quasi "self-stabilising system".

Figure 2B:
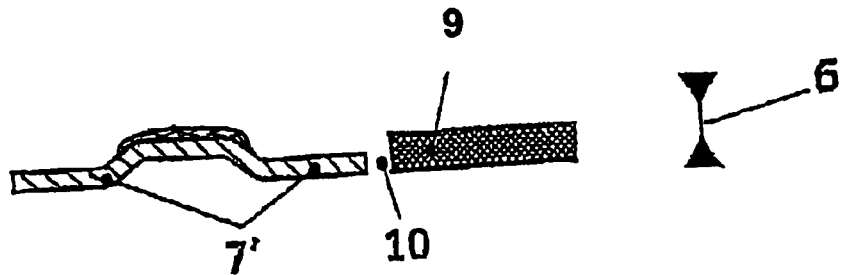
FIG. 2c shows a plan view of a bipolar plate of the invention.

FIG. 2b shows a further bead arrangement, the bead arrangement 7'. The only difference in this arrangement from that from FIG. 2a consists in that here a bead is designed as a full bead (here approximately with semi-circular cross-section). There are still numerous further embodiments of the present invention. Hence, it is possible to show, for example still further bead geometries than those shown here, multiple beads are also possible. In addition, the bead seal of the invention is possible for all seals in the region of the electrochemical cell stack to be pressed. It is not only possible to seal the electrochemically active region 10 around the gas diffusion layer, but also any passages for gaseous or liquid media etc. For the seal around the electrochemical cell stack assembly guide (screw holes), the elasticity of a bead arrangement may be used in order to counter-control a settling process in the stack and to compensate possible tolerances.

Figure 2C:
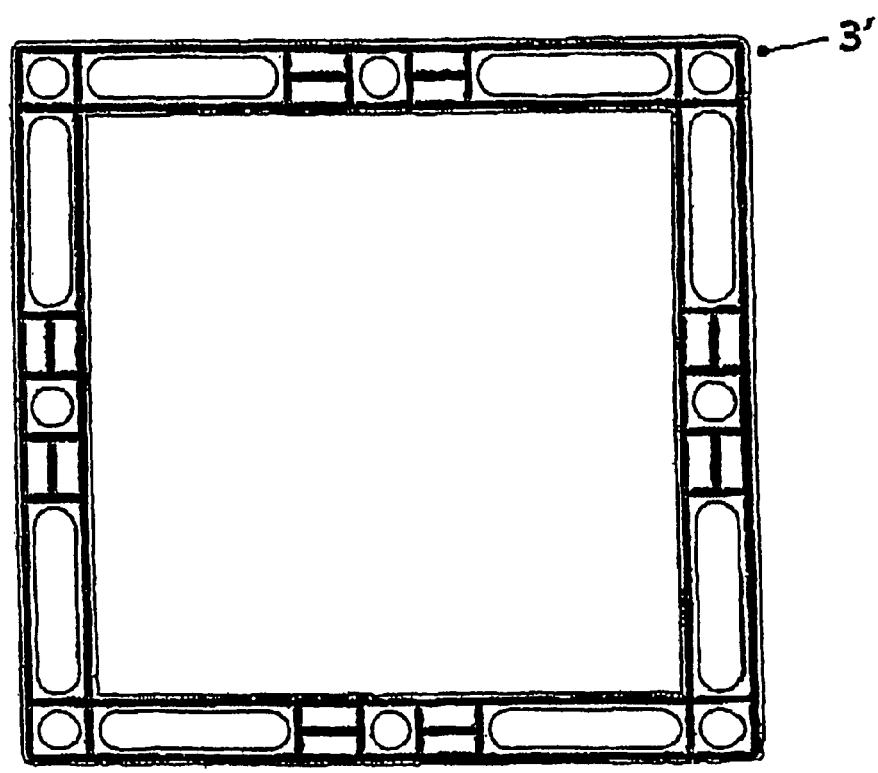

FIG. 2c shows a plan view of a further embodiment 3' of a bipolar plate of the invention. The bead arrangements can thus be seen in plan view by a broad line. The bead arrangements thus serve to seal several passage openings.

FIGS. 3a to 3d show various bead arrangements which have in each case a stopper. This stopper serves to limit the deformation of a bead so that it cannot be compressed beyond a certain dimension.

Hence, FIG. 3a shows a single-layer bead arrangement with a full bead 11", the deformation limit of which is reached in direction 15 by a corrugated stopper 29. FIG. 3b shows a double-layer bead arrangement, in which a full bead of the upper layer is limited in deformation by a folded metal sheet lying therebelow (see ref. numeral 34). FIGS. 3c and 3d show bead arrangements, in which at least two full beads are opposite one another and either a folded sheet (see FIG. 3c) or a corrugated sheet (see FIG. 3d) is provided to limit deformation.

Figure 4:
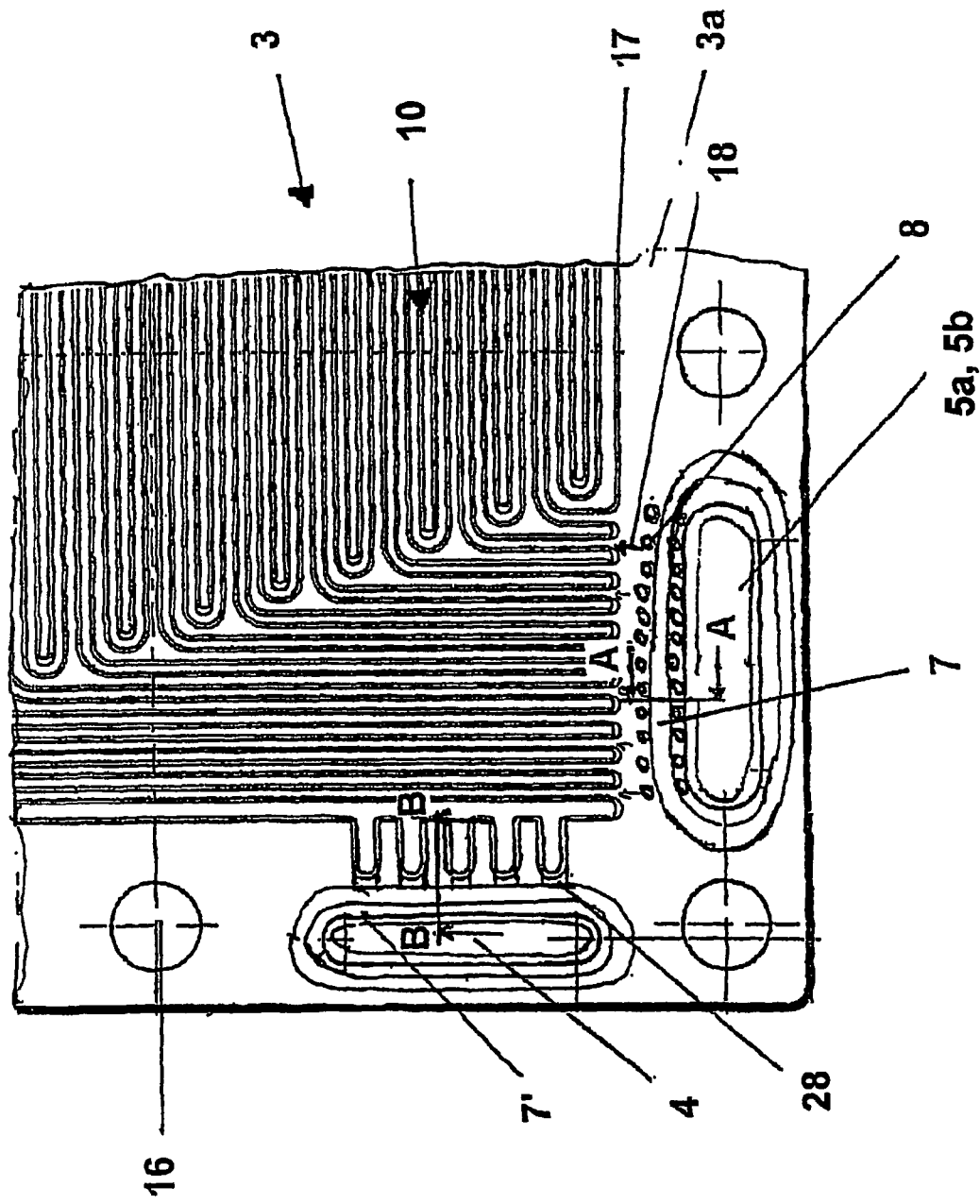
FIG. 4 shows a cutout of an industrially manufactured bipolar plate.

FIG. 4 shows a detailed structure of a cutout of a bipolar plate 3, which has been illustrated above in principle using FIG. 1a. This bipolar plate can be applied in principle to any electrochemical systems, that is for example to electrochemical compressor systems mentioned above or to fuel cell systems.

The bipolar plate 3 consists of two metal plates 3a and 3b (the lower plate 3b can be seen in FIG. 5b) which are arranged one above another. The plate 3a (the corresponding case applies to plate 3b) has embossed duct structures 17 which extend from the plane of the paper upwards. The ducts formed between these projections (indicated by small arrows 18, which show the direction of the duct course) serve for specific passage of gases to the electrochemically active region of the electrochemical cell.

The opening 5a or 5b is surrounded by a full bead and serves to supply media, such as $H_2$ or water, to the electrochemically active region. The bead arrangement 7 surrounding the opening 5 is thus provided with hole-like perforations 8, which permit supply of media through the perforations 8 in the direction of arrows 18.

The opening 4 serves to supply cooling liquid to the gap between the plates 3a and 3b. The opening 4 is surrounded by a bead arrangement 7'. Ducts 28, which are connected to perforations 8' not shown (see FIG. 6a), go from the bead arrangement into the interior of the bipolar plate 3.

FIG. 5a shows a cutout of the upper plate 3a of a bipolar plate 3. The bead arrangement 7 is shown in cross-section, which surrounds the opening 5a or 5b. The section corresponds to the section line A-A, as can be seen in FIG. 4. The bead arrangement 7 shows in cross-section a full bead, that is a flank 7b connecting to a flat region (which surrounds the opening) and which is rising and after a horizontal piece a falling flank 7a, which is connected to a further horizontal piece. The flanks 7b and 7a thus have circular perforations 8, the supply of gas, for example $H_2$, is indicated by corresponding arrows (they correspond to the arrow direction 18 in FIG. 4). Of course it is also possible to provide oval or angular perforations or only to provide a half bead, in which only a falling flank would be provided starting from a horizontal region. The openings 8 are thus open towards the electrochemically active region 10 of the electrochemical cell 2 or the bipolar plate 3, so that a media fluid, such as for example air, $H_2$ or water, may pass here. In alternative designs, it is of course also possible that only one flank, for example the flank 7a, contains perforations.

The plate 3a is made from metal, titanium grade 1, 2, or 4; nickel 200, 201 or 601 and contains the bead arrangement 7 integrally; highly alloyed steels, which are suitable for electrochemical cells, for example 1.45 71, 1.44 04, 1.44 01 or 1.44 39, are thus provided as metals. They can also be easily processed on a large scale.

FIG. 5b shows a bipolar plate 3 in an electrochemical cell stack or a fuel cell or an electrochemical compressor system. A cutout around the opening 5, which is an "interface" duct, is shown. An electrochemical cell 2, to which in turn bipolar plates (in some cases not shown) are connected, is arranged in each case above and below the bipolar plate 3, for better illustration, the representation of separate gas diffusion layers was dispensed with. A gas coming through the interface duct passes through the latter essentially in direction 19. The main flow direction in the interface duct is indicated by the arrow 19, further distribution of the gas in the electrochemically active region 25 takes place between upper side of the bipolar plate 3 and electrochemical cell 2 in the direction of arrows 20, and in addition further distribution is possible through the cavity 14 due to appropriate cavity shape of the bipolar plate. The passage of molecular hydrogen on the other flat side of the bipolar plate 3, that is region 21, is also possible in corresponding manner.

FIG. 5b additionally shows how the cavity 14 is separated from a cavity 13 filled with cooling liquid by a joining region 26.

Figure 6A:
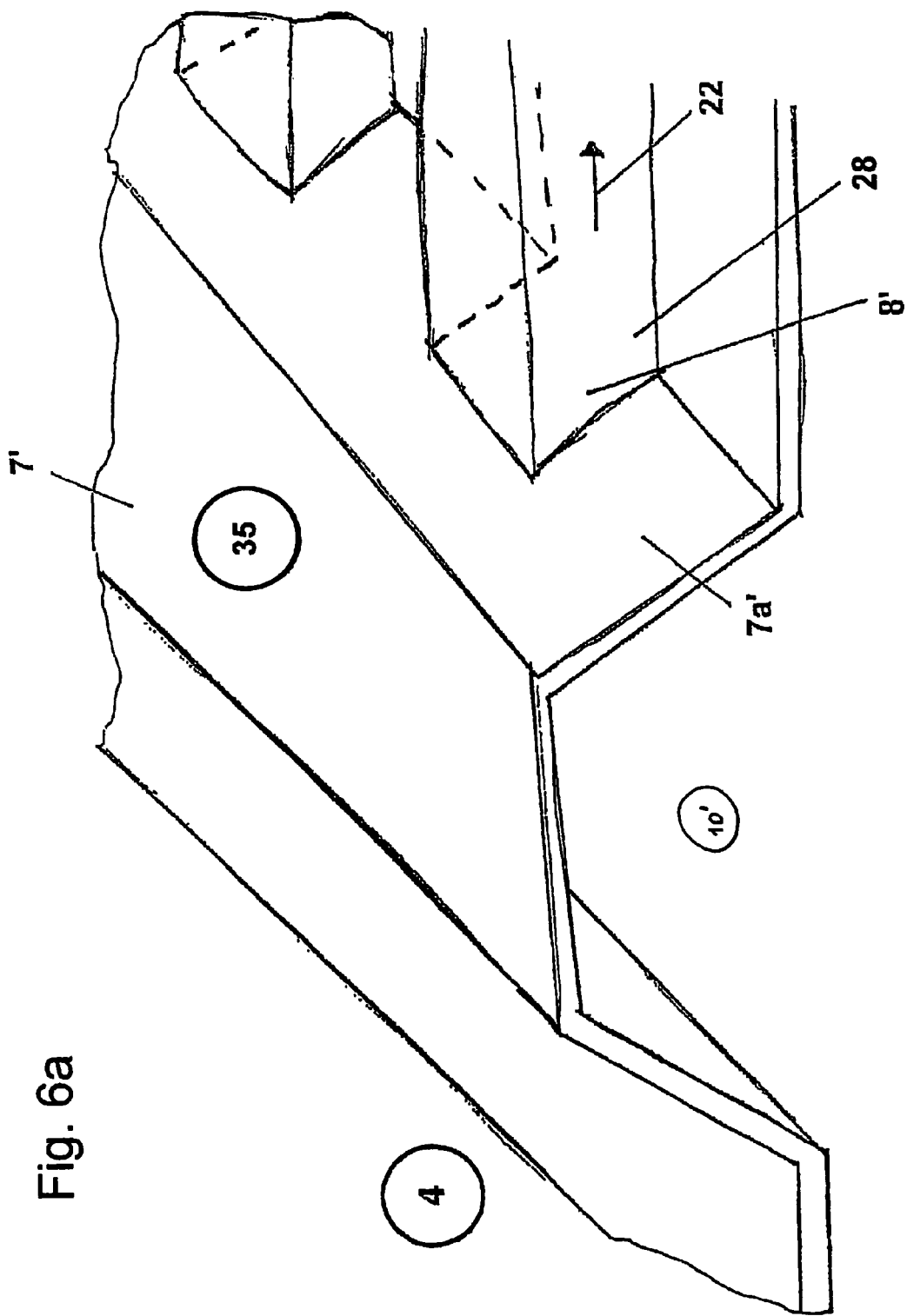
FIGS. 6a to 6c show illustration of a bead arrangement with perforations and ducts connected thereto.

FIG. 6a shows a cutout of a bead arrangement 7' which shows the surrounding region of opening 4 (according to section B-B).

The bead arrangement 7' has in turn a full bead. This full bead has on its flank 7a', perforations 8' to which ducts 28 are connected on the outer side of the bead arrangement. These ducts 28 ensure that a connection is provided with the bead interior and hence no gas, which is passed in direction 22, may pass to the bead outer surface 35.

Figure 6B:
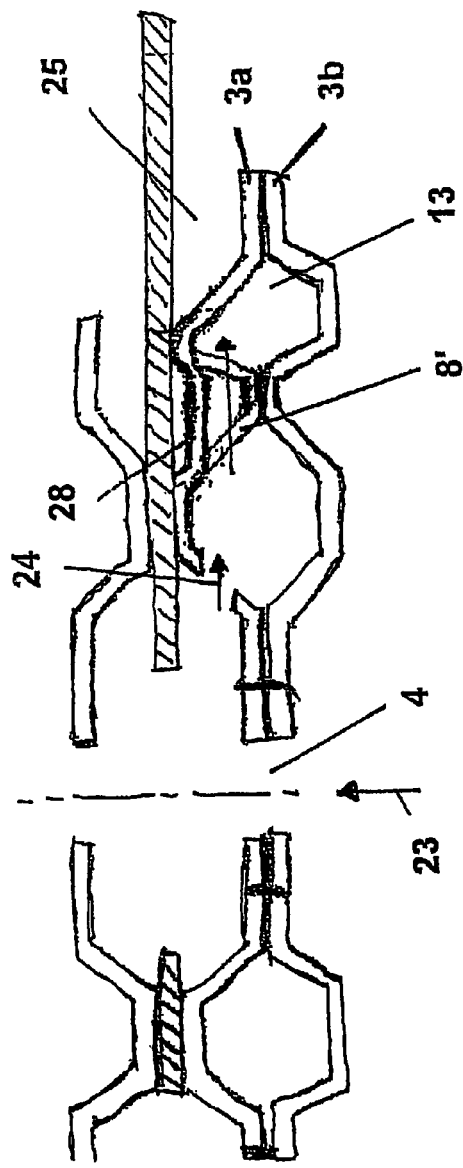

FIG. 6b shows once again a section through a part of the electrochemical cell stack, and specifically in the region around an opening 4 (the latter belongs to an interface duct, for example for cooling agent, in this case distilled water). This water flows generally in direction 23, a part stream is separated off in direction 24 to the cavity 13 which accommodates the cooling liquid. It is thus possible to see well in FIG. 6b that faultless passage of the cooling liquid into the cavity 13 is provided through the duct 28, which is connected to the perforation 8', without the region 25 filled with $O_2$ between the plate 3a and the electrochemical cell 2 lying thereabove being contaminated with cooling liquid.

Figure 6C:
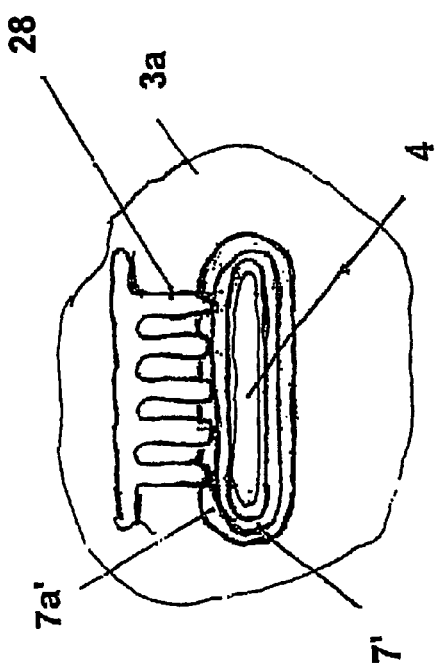

FIG. 6c shows once again a detailed view of the region around the opening 4 in plan view. A correspondingly small cutout of the upper plate 3a of bipolar plate 3 is thus shown. It can be seen particularly well that the bead arrangement 7', to the flank 7a' of which the ducts 28 are connected, which then guide cooling liquid into the cavity 13 (as it were into the plane of the paper), is provided around the opening 4.

The bead arrangements of the invention are provided particularly for when bipolar plates having the required tightness can be produced cost-effectively for series production with a very high quality standard. The construction of the bipolar plates having integral bead arrangements is thus provided in particular. It is thus possible to produce the bead arrangements integrally from a sheet metal part, for example by embossing (for example at the same time for embossing of the duct structure), very low production costs thus result. In particular it is not necessary to adapt additional components for sealing, the positioning of which may be expensive.

Figure 7A:
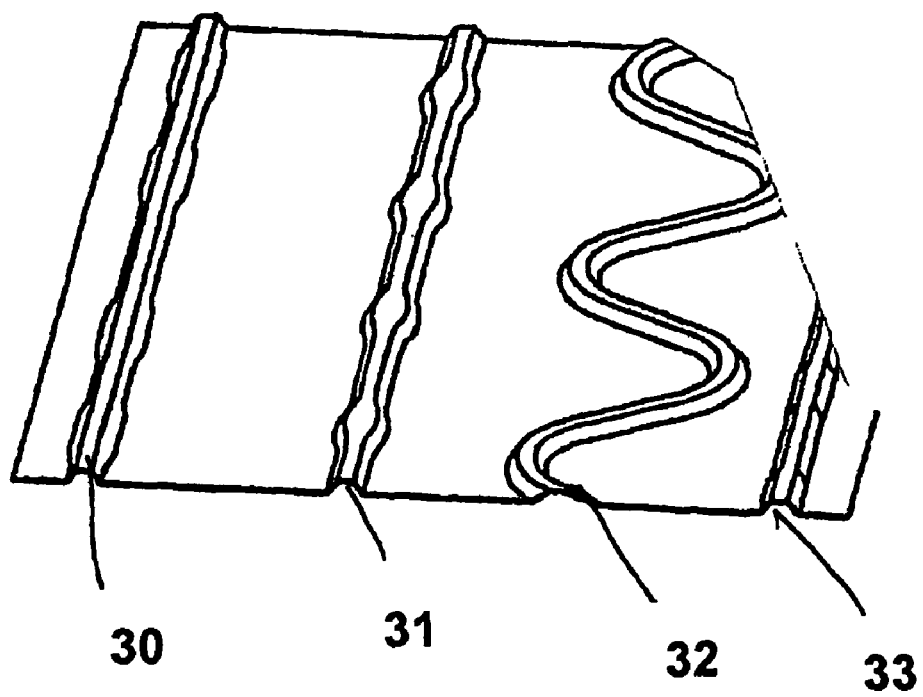
Figure 7C:
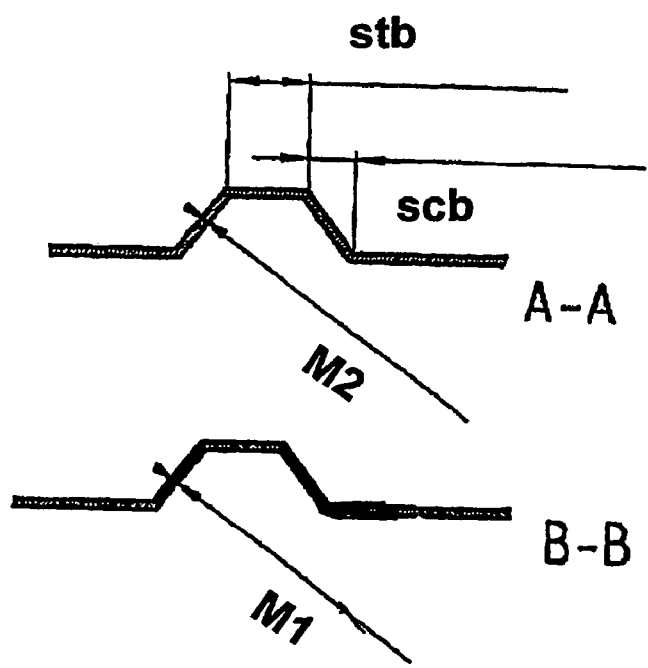

FIGS. 7a to 7c show different embodiments of bead arrangements. All these bead arrangements can be applied to the bead arrangements mentioned above to define the electrochemically active region or openings and perforations. For the sake of a better overview, the latter are nevertheless designated below by new reference numbers 30-33.

FIG. 7a shows first of all the different possible modifications of bead arrangements in 3D position by way of example. This concerns specific courses for full beads (see for example FIG. 2b with bead arrangement 7' or FIGS. 5a (bead arrangement 7) or 6a (bead arrangement 7'). Corresponding courses are also applicable to full beads. Concerning further details, attention is drawn to the above-said.

The bead arrangement 33 thus shows a bead of variable material thickness. Cross-sections of the bead arrangement are shown as A-A or B-B (see FIG. 7c). Here A-A shows a material thickness of M2, in cross-section B-B a material thickness of M1 is shown. In FIG. 7b f characterises a region which represents the shortest distance of two identical points in the repeating structure. As the regions within the repeating structures may relate to stiff and less stiff regions, whose length ratios may be variable, the stiffer region here is designated "1". (The above definition of the frequency also applies to the arrangements 30 to 32).

Bead arrangement 32 shows a corrugated course of the bead arrangements. For the corrugated course the frequency f can also be selected here, likewise the amplitude AMP and the radius R (see FIG. 7b), wherein the pressure distribution or compression stiffness of the bipolar plate can be selected due to this corrugated design.

The bead arrangement 31 shows a variable bar width, which may likewise be supplied with any frequency f. "Bar-width" is thus understood to mean the outer width of the upper flat section corresponding to the bar width "stb" defined in FIG. 7c. For the bead arrangement 31 this alternates between the values stb1 and stb2 (stb1 here may be between 0.1 and 5 mm, stb2 may be between 0, 2 and 10 mm).

Finally, the bead arrangement 30 can also be seen, which shows beads having variable limb width. A change in limb widths is thus in turn provided, for example at a predetermined frequency f. For precise definition of the limb widths, reference is made in turn to FIG. 7c, there "scb" has been defined as the measure of the limb width (measured at the outer surface of the bipolar plate), for the bead arrangement 30 shown here this alternates between scb1 and scb2 (scb1 may be between 0.3 and 5 mm, scb2 may be between 0, 2 and 3 mm).

The invention claimed is:

1. An electrochemical system comprising:
    an electrochemical cell stack having a layering of a plurality of electrochemical cells and including an electrochemically active region, said electrochemical cell stack being under mechanical compression in a direction of said layering of said plurality of electrochemical cells;
    a plurality of metallic bipolar plates separating said electrochemical cells from one another, said bipolar plates including openings for media for said electrochemical cells, said openings extending in a direction parallel with said direction of said layering of said plurality of electrochemical cells,
    at least one resilient bead arrangement around at least one of said openings, said at least one resilient bead arrangement being formed integrally as one piece with one of said plurality of metallic bipolar plates and including at least one flank extending in a direction that is not perpendicular to said direction of said layering of said plurality of electrochemical cells;
    at least one perforation through said at least one flank, said at least one perforation allowing the media that passes through said at least one of said openings in a direction parallel with said direction of said layering of said plurality of electrochemical cells to pass through the flank of the bead in a direction perpendicular to said direction of said layering of said plurality of electrochemical cells.

2. An electrochemical cell system according to claim 1, wherein said at least one perforation is circular, oval, or angular in cross section.

3. An electrochemical cell system according to claim 1, further comprising:
    a bead interior and a bead outer surface of said at least one resilient bead arrangement; and
    a duct connected to said at least one perforation, wherein said duct is closed at least towards said beading outer surface and is connected to said beading interior.

4. An electrochemical cell system according to claim 1, wherein said at least one perforation is open towards said electrochemically active region.

5. An electrochemical cell system according to claim 1, wherein said at least one resilient bead arrangement further includes perforations on two flanks.

6. An electrochemical cell system according to claim 1, wherein at least a portion of said at least one resilient bead arrangement is coated with at least one of a microseal media and an elastomer.

7. An electrochemical cell system according to claim 1, wherein said electrochemical system is a fuel cell system and said electrochemical cell stack is a fuel cell stack.

8. An electrochemical cell system according to claim 1, wherein said electrochemical system is an electrochemical compressor system and said electrochemical cell stack is an electrochemical compressor stack.

* * * * *